UNITED STATES PATENT OFFICE.

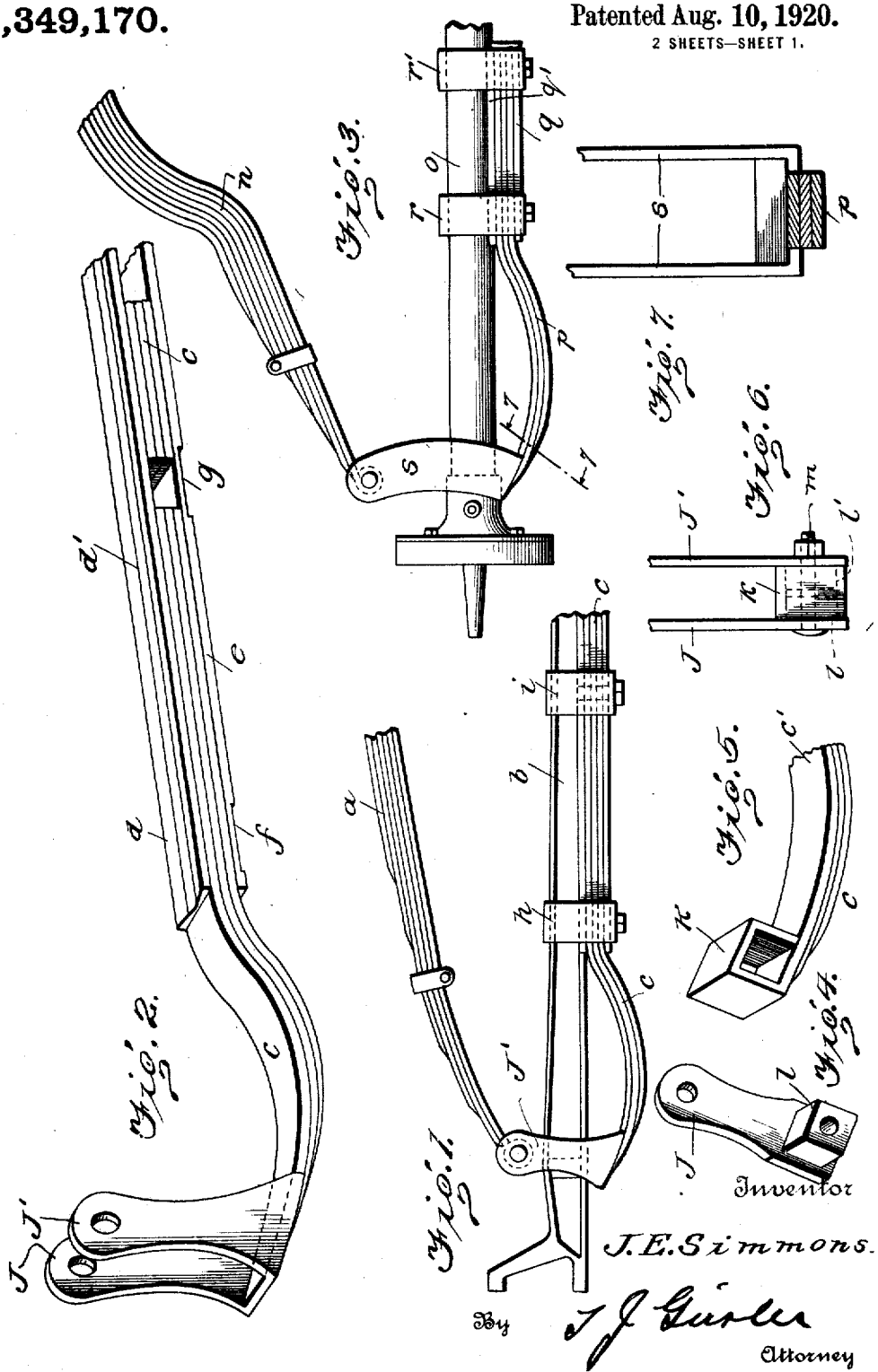

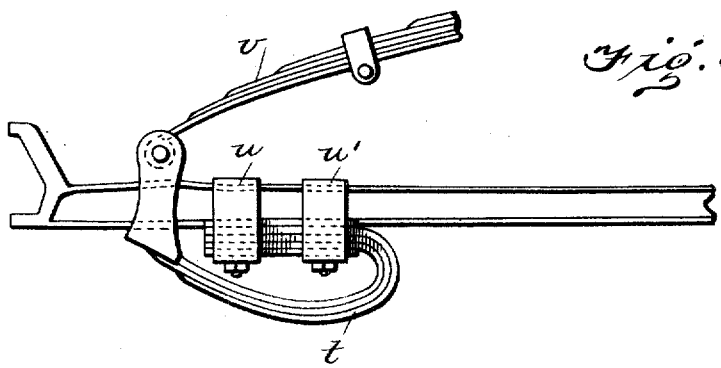
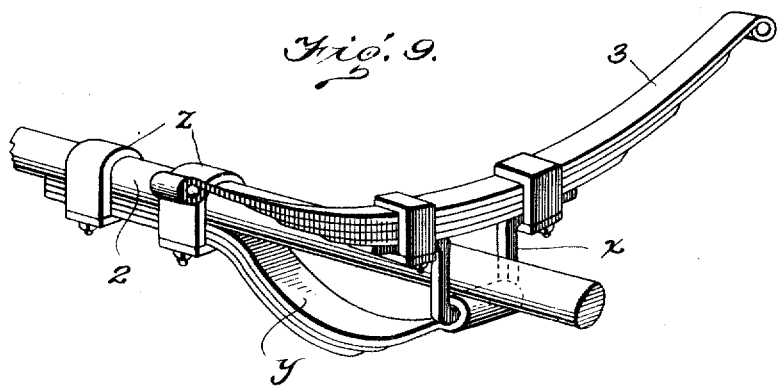
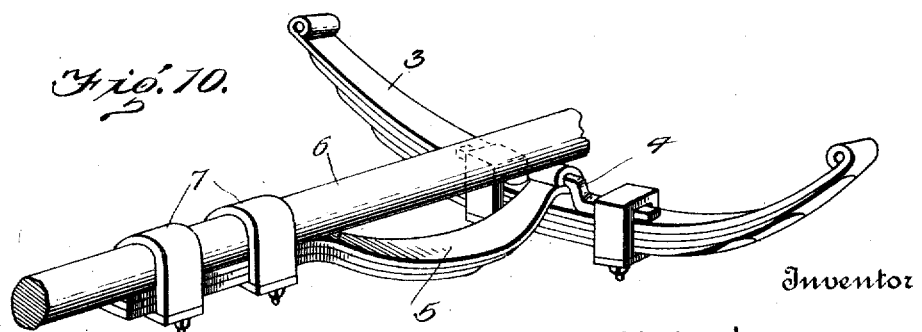

JOHN E. SIMMONS, OF PORTLAND, OREGON.

SPRING-SUPPORT FOR VEHICLE-BODIES.

1,349,170.  Specification of Letters Patent.  Patented Aug. 10, 1920.

Application filed September 7, 1918. Serial No. 253,051.

*To all whom it may concern:*

Be it known that I, JOHN E. SIMMONS, a citizen of the United States, and a resident of Portland, in the county of Multnomah and State of Oregon, have invented a new and useful Improvement in Spring-Supports for Vehicle-Bodies, of which the following is a specification.

My invention relates to the resilient support of the body vehicles of the auto type on their chassis.

It is desirable to have the effect of a full elliptic spring; but, since it is also desirable to have the vehicle body as low as possible, difficulty was heretofore found in arranging the spring elements as desired, with the result that the best effects were not obtained.

The object of my invention is to support the vehicle body by springs which are adapted to give a maximum degree of resiliency, to provide an efficient shock absorbing element and to render the vehicle more comfortable to ride in.

Also to accomplish this result by simple devices; and so to arrange the parts that repairs can be readily and inexpensively made.

I attain my object by the combinations of parts illustrated in the accompanying drawings, in which:

Figure 1 shows in front elevation the left hand portion of the front axle of a running gear of the type used in Ford automobiles; the construction and arrangement of the parts at the right hand end are the same.

Fig. 2 is a larger scale perspective of the complementary spring member fastened to the lower side of the axle; this figure also shows the plates between which the complementary spring member is fastened in place on the axle.

Fig. 3 shows the details of construction for mounting the vehicle body on the rear axle by my improved spring support.

Figs. 4 to 6 inclusive, show details of a modification which may be made in the connection between the free ends of the upper half-elliptic springs and the related free ends of the complementary spring-members.

Fig. 7 is a section on line 7—7 of Fig. 3, looking in the direction pointed by the arrow;

Fig. 8 shows a different and very effective arrangement of the complementary spring-member; and Figs. 9 and 10 show details of construction which may be followed where the half-elliptic springs are disposed longitudinally to the vehicle body and thus at right angles to the axle.

Referring first to Fig. 1: $a$ shows a portion of the left hand end of the front laminated half-elliptic spring fastened crosswise at the front end of a vehicle body; $b$ is the corresponding axle portion to the under side of which is fastened the complementary laminated spring-member $c$. The fastening may be made as illustrated more clearly in Fig. 2; the complementary spring-member being interposed between stiffening plates $d$, $e$. The upper stiffening-plate $d$, has its upper face—the one opposed to the axle—channeled, as illustrated at $d'$, so as to accommodate the irregular surfaces of the axle. The lower stiffening-plate $e$, is provided with recesses $f$, $g$, the latter being located at the center of the axle; and clips $h$, and $i$, fasten the parts together as illustrated in Fig. 1.

The free end of the complementary spring-member $c$, is provided with ears $j$, $j'$, spaced apart for receiving the related end of the axle $b$, and permitting the latter to have relative vertical movement between said ears.

In order to facilitate repair, the ears $j$, $j'$ may be detachably secured in place. For such purpose, the upper leaf $c'$, of the complementary spring - member $c$, is formed with an integral box $k$, see Fig. 5, and the ears are provided with opposed lugs $l$, $l'$, as illustrated in Figs. 4 and 6; and these lugs are inserted in the box $k$, and the ears are secured in place by bolt $m$ as also illustrated in Fig. 6.

The construction for the rear axle of the vehicle is illustrated in Fig. 3 and it will be noted that the arrangement of the parts is substantially the same as described. The half-elliptic spring $n$, is fastened to the vehicle body; to the under side of the rear axle $o$, is fastened a complementary spring-member as $p$, clamped between stiffening-plates $q$, $q'$, by means of clips $r$, $r'$. The free ends of the complementary spring-member $p$, are provided with ears $s$, spaced apart, as shown in Fig. 7, and to these is connected the half-elliptic spring $n$. The connecting bolts are omitted in Fig. 3, likewise in the illustration of Fig. 1.

In the construction illustrated in Fig. 8, a complementary laminated spring-member $t$ is secured to the under side of each axle end. These complementary spring-members are bent over on themselves; they are secured in place by clips $u$, $u'$, and their free ends are provided with ears straddling the axle ends, and connecting the free ends of the complementary spring-members with the related free end of the half-elliptic spring-member.

Where the half-elliptic spring-members are disposed longitudinally to the vehicle body, my invention would be applied as illustrated in Figs. 9 and 10. Referring to the former construction first: the half-elliptic spring 3, which is attached to the vehicle body, has fastened to its under side a stirrup $x$, to which the free end of the complementary spring-member $y$, is fastened; said complementary spring-member being fastened to the axle by clips $z$, the ends of the axle 2 projecting through the stirrup $x$ as illustrated.

In Fig. 10 the half-elliptic spring 3, fastened to the vehicle body, has fastened thereon a stirrup 4, to which the free end of the complementary spring-member 5, is fastened; the complementary spring-member being fastened on the axle, 6, by clips 7.

The illustrations merely express a convenient mode of carrying my invention into practice, the particular details described may be varied to suit the ideas of the manufacturer.

I claim:

1. In a vehicle running gear, the combination of a laminated half elliptic spring fastened to the vehicle body, a complementary laminated spring member fastened on the under side of the axle, and a connection between the adjacent ends of the complementary spring member and the half elliptic spring, the connection spanning the axle end, which is permitted relative vertical motion therein.

2. In a running gear, the combination of a laminated half elliptic spring fastened to the vehicle body, a complementary laminated spring fastened to the axle, and ears connecting the free end of said complementary member with the adjacent end of said half elliptic spring member the ears spanning the axle end, which is permitted relative vertical motion therein.

3. In a running gear, the combination of a laminated half elliptic spring fastened to the vehicle body, a complementary laminated spring fastened to the under side of the axle, and ears connecting the free end of said complementary member with the adjacent end of said half elliptic spring member, the ears spanning the axle end, which is permitted relative vertical motion therein.

4. In a running gear, the combination of a laminated half elliptic spring fastened to the vehicle body, a complementary laminated spring fastened to the axle, and demountable ears connecting the free end of said complementary member with the adjacent end of said half elliptic spring member, the ears spanning the axle end, which is permitted relative vertical motion therein.

5. In a running gear, the combination of a laminated half elliptic spring fastened to the vehicle body, a complementary laminated spring fastened to the under side of the axle, and demountable ears connecting the free end of said complementary member with the adjacent end of said half elliptic spring member, the ears spanning the axle end, which is permitted relative vertical motion therein.

6. In a vehicle running gear, the combination of a laminated half elliptic spring fastened to the vehicle body, a complementary laminated spring member fastened on the under side of the axle end, such complementary spring being bent over on itself, an attaching element connecting the free end of said complementary spring-member with the adjacent end of the half elliptic spring, and the axle end projecting beyond said attaching element and being permitted relative vertical motion therein.

7. In a vehicle running gear, the combination of a laminated half elliptic spring fastened to the vehicle body, a complementary laminated spring member fastened on the under side of the axle end, such complementary spring being bent over on itself, and ears connecting the free end of said complementary spring member with the adjacent end of the half elliptic spring, the ears straddling the axle end, which is permitted relative vertical motion.

Signed at Portland, Oregon, this 27th day of August, 1918.

JOHN E. SIMMONS.